United States Patent
McCulloch

(10) Patent No.: US 7,513,297 B1
(45) Date of Patent: Apr. 7, 2009

(54) PORTABLE HEAT TRANSFER SYSTEM AND METHOD

(76) Inventor: Garry F. McCulloch, 1920 Northgate Blvd. Suite A8, Sarasota, FL (US) 34234

( * ) Notice: Subject to any disclaimer, the term of this patent is extended or adjusted under 35 U.S.C. 154(b) by 638 days.

(21) Appl. No.: 11/179,180

(22) Filed: Jul. 12, 2005

(51) Int. Cl.
*B60H 1/00* (2006.01)

(52) U.S. Cl. ............................ 165/41; 165/44; 165/122; 454/119

(58) Field of Classification Search .................. 165/41, 165/42, 43, 44, 46, 120, 121, 122; 454/119, 454/152; 2/171.3
See application file for complete search history.

(56) References Cited

U.S. PATENT DOCUMENTS

| | | | | |
|---|---|---|---|---|
| 3,280,896 A | * | 10/1966 | Goodson et al. | 165/43 |
| 3,383,778 A | * | 5/1968 | Goodman | 165/41 |
| 4,024,730 A | | 5/1977 | Bell et al. | |
| 4,146,933 A | | 4/1979 | Jenkins et al. | |
| 4,502,480 A | * | 3/1985 | Yamamoto | 128/201.15 |
| 4,557,320 A | * | 12/1985 | Allen | 165/46 |
| 5,146,757 A | | 9/1992 | Dearing | |
| 5,197,294 A | * | 3/1993 | Galvan et al. | 62/3.62 |
| 5,245,994 A | * | 9/1993 | Chang et al. | 128/201.25 |
| 5,251,281 A | * | 10/1993 | Fravel, Jr. | 392/384 |
| 5,404,652 A | | 4/1995 | Sher | |
| 5,407,135 A | * | 4/1995 | Jeffs | 239/288 |
| 5,429,534 A | | 7/1995 | Cano | |
| 5,823,869 A | * | 10/1998 | Paturzo | 454/152 |
| 5,921,467 A | * | 7/1999 | Larson | 165/46 |
| 6,021,584 A | * | 2/2000 | Schwartz | 34/666 |
| 6,131,645 A | * | 10/2000 | Barr | 165/41 |
| 6,199,293 B1 | * | 3/2001 | Bodnar et al. | 34/61 |
| 6,343,483 B1 | | 2/2002 | Armstrong | |
| 6,510,696 B2 | | 1/2003 | Guttman et al. | |
| 6,676,188 B1 | | 1/2004 | McKinney | |
| 6,704,944 B2 | * | 3/2004 | Kawainshi et al. | 2/171.3 |
| 6,884,159 B1 | * | 4/2005 | Ferraud, Jr. | 454/119 |
| 6,925,655 B1 | * | 8/2005 | Maki et al. | 2/171.3 |
| 6,954,944 B2 | * | 10/2005 | Feher | 2/171.3 |
| 7,303,034 B1 | * | 12/2007 | Knuth | 180/68.1 |

* cited by examiner

*Primary Examiner*—Ljiljana (Lil) V Ciric
(74) *Attorney, Agent, or Firm*—Charles J. Prescott

(57) ABSTRACT

For use in warming a rider on a motorcycle having a heat-producing engine, a portable heat transfer system and method of warmth. The system includes an air blower having an air inlet and an air outlet and being adapted to be positioned and secured preferably behind the engine in an area of heated air build-up beneath a rider seat where heat as a byproduct of engine operation accumulates. The air blower is connectable to an electric power source of the motorcycle to operate the air blower. An elongated flexible air transfer conduit is connectable at one end thereof to the air outlet of the air blower while an air outlet nozzle is connected to another end of the conduit. The outlet nozzle is adapted in size and shape to be inserted and held beneath a conventional upper torso garment worn by the rider whereby warmed air is drawn into the conduit from the area of heated air build-up by the air blower is discharged from the nozzle beneath the upper torso garment to warm the rider.

3 Claims, 4 Drawing Sheets

PORTABLE HEAT TRANSFER SYSTEM AND METHOD

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to motorcycle riders' accessories and more particularly to a portable body warming apparatus easily attachable between the motorcycle and a conventional upper torso garment worn by the rider.

2. Description of Related Art

A broad array of accessory equipment is readily available to the motorcycle-riding enthusiast. One aspect of these popular accessories is related to dealing with inclement weather, including rain and cold winds and temperatures. During riding periods of cold air temperatures, engine heat typically warms the lower torso of the rider; however, the upper torso being typically exposed more directly to oncoming cold air, is subject to greater degrees of air chill and requiring heavier upper torso garments.

Prior art teaches a number of environmental-modifying apparatus and equipment for transferring air of different temperatures from one location or equipment component to another or into equipment worn by a user. The following U.S. patents are examples of heat transfer equipment of this general nature:

U.S. Pat. No. 4,024,730 to Bell, et al.
U.S. Pat. No. 4,146,933 to Jenkins, et al.
U.S. Pat. No. 5,146,757 to Dearing
U.S. Pat. No. 5,404,652 to Sher
U.S. Pat. No. 5,429,534 to Cano
U.S. Pat. No. 6,343,483 to Armstrong
U.S. Pat. No. 6,510,696 to Guttman, et al.
U.S. Pat. No. 6,676,188 to McKinney U.S. Pat. No. 4,146,933 to Jenkins, et al. discloses a conditioned-air suit and system and in particular FIG. 7 illustrates the system adapted for use with the hot-water radiator system or engine oil system of a vehicle. Sher teaches a portable heater for personal use in U.S. Pat. No. 5,404,652.

Guttman, et al., in U.S. Pat. No. 6,510,696 teaches a system for conditioning air and in particular with regard to FIG. 11A disclosing use with a motorcyclist. The discussion in Column 10 teaches a motorcyclist connecting the hot air outlet to a body suit or jacket.

The present invention provides an easily manufacturable, economical portable heat transfer system and method which will derive heated air from an area immediately behind the engine and between the legs of the rider and directed by a small blower included in the system upwardly through a flexible conduit and beneath an outer upper torso garment worn by the rider.

BRIEF SUMMARY OF THE INVENTION

This invention is directed to a portable heat transfer system and method of warmth. The system includes an air blower having an air inlet and an air outlet and being adapted to be positioned and secured behind the engine in an area of heated air build-up beneath a rider seat where heat as a byproduct of engine operation accumulates. The air blower is connectable to an electric power source of the motorcycle to operate the air blower. An elongated flexible air transfer conduit is connectable at one end thereof to the air outlet of the air blower while an air outlet nozzle is connected to another end of the conduit. The outlet nozzle is adapted in size and shape to be inserted and held beneath an upper torso garment worn by the rider whereby warmed air is drawn into the conduit from the area of heated air build-up by the air blower is discharged from the nozzle beneath the upper torso garment to warm the rider.

It is therefore an object of this invention to provide a portable heat transfer system for delivering warmed air beneath the outer upper torso garment being worn by a motorcycle rider.

Still another object of this invention is to provide a heating arrangement for motorcycle riders which derives heat from the motorcycle engine and accumulates and transfers this warm air for heating the upper torso of the motorcycle rider.

Yet another object of this invention is to provide an easily installable portable heat transfer system easily attachable to existing features of a motorcycle and is easily connectable electrically for operating the system's blower to one of the unused access switches or circuits of conventional motorcycles.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 3:
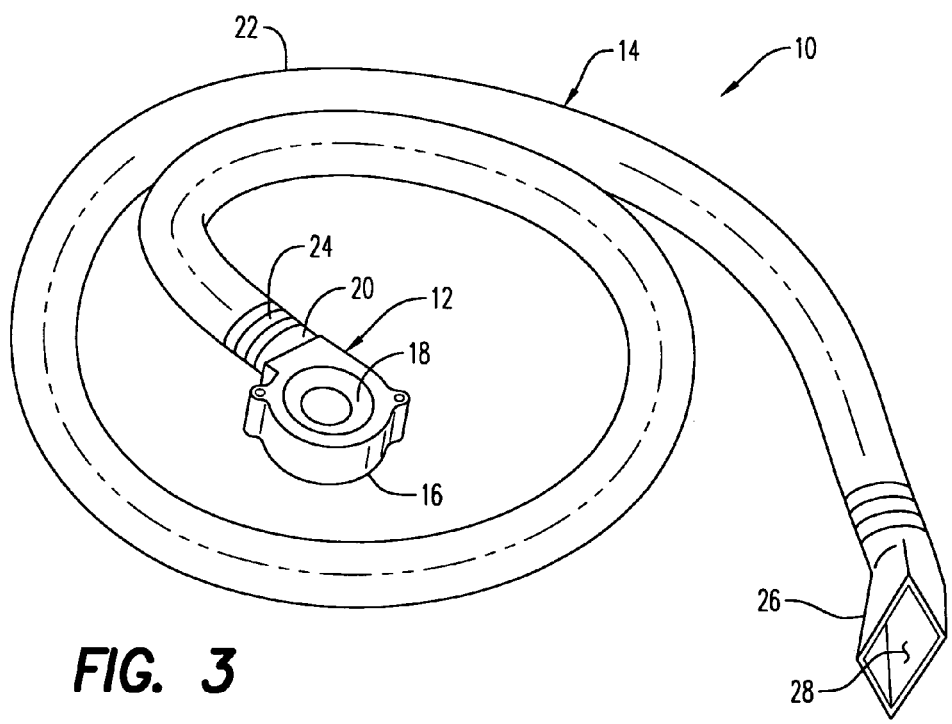
FIG. 3 is a perspective view of the entire portable heat transfer system of this invention.
Figure 5:
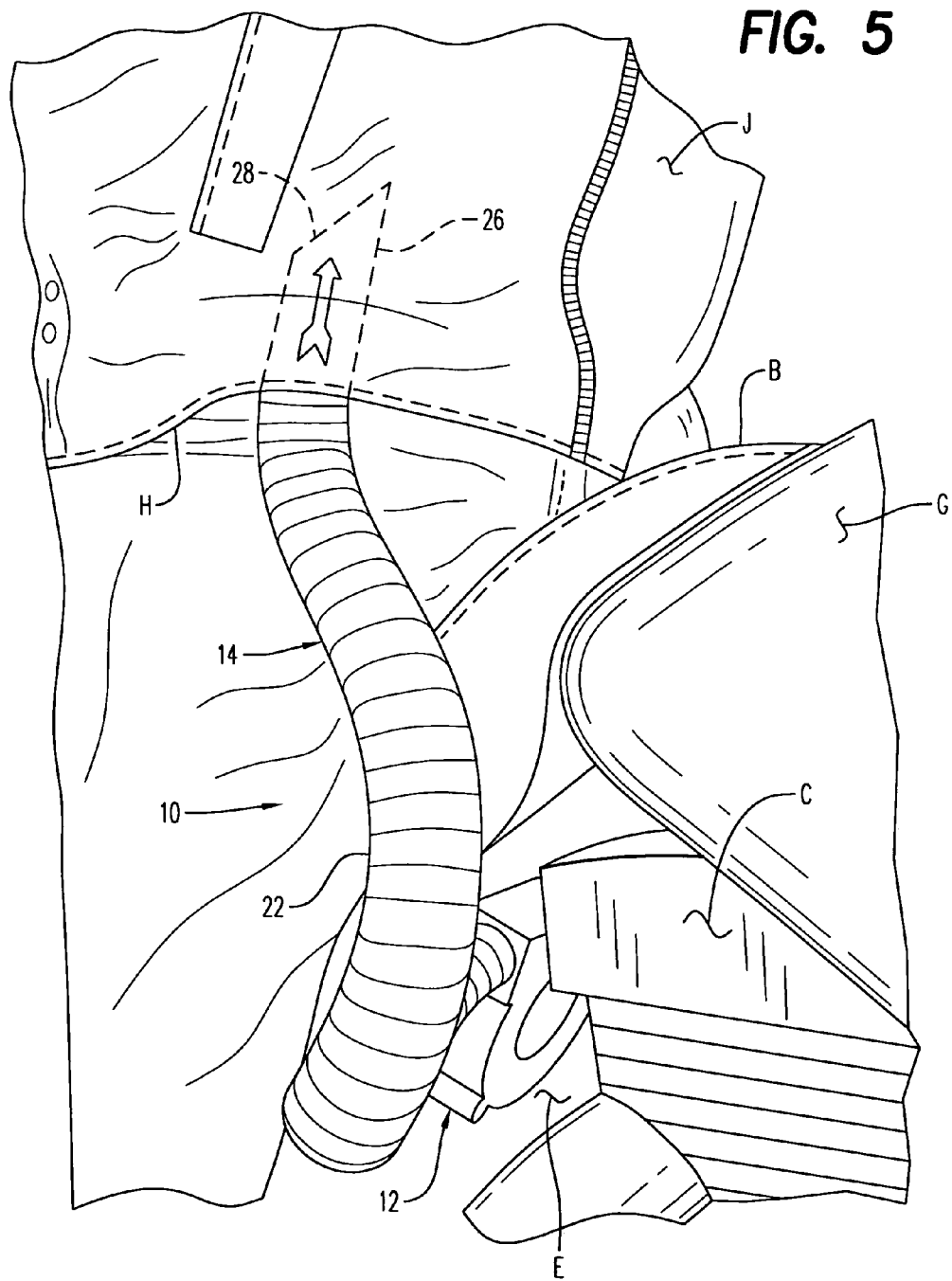
FIG. 5 is an enlarged perspective view of the system in full operation with respect to a motorcycle rider seated atop the motorcycle.

Referring now to the drawings, the invention is there shown generally at numeral 10 in FIGS. 3 and 5 and includes a small 12- or 24-volt blower motor 12 and a flexible, preferably ribbed plastic conduit assembly 14. The blower 12 includes a side entry air intake 18 within a molded plastic housing 16 and further includes an elongated cylindrical discharge snout or air outlet 20.

The flexible conduit 14 is formed preferably of a length of ribbed plastic tubing 22 having ribs 24 extending along the entire length thereof to enhance flexibility and to resist crushing or crimping of the conduit 22 itself. One end of the flexible air transfer conduit 22 as best seen in FIG. 3 is attached over the tubular outlet 20 of the air blower 12 while the other end of the conduit 22 is connectable onto an air outlet nozzle 26 having a tapered or angularly oriented opening 28 thereof which is easily insertable beneath the upper torso garment into the position shown in FIG. 5 and described in more detail herebelow. The particular air blower utilized in conjunction with this invention is manufactured by Radio Shack, Inc., P/N 273-199.

Figure 1:
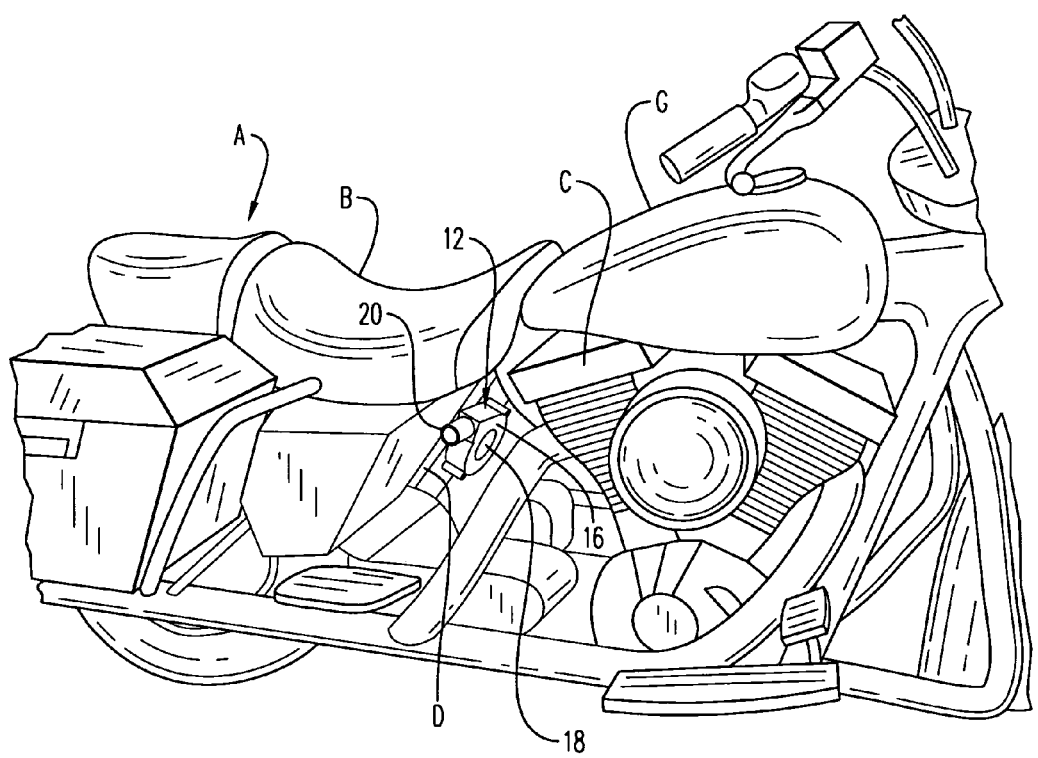
FIG. 1 is a perspective view of a typical motorcycle with the invention installed therein.
Figure 2:
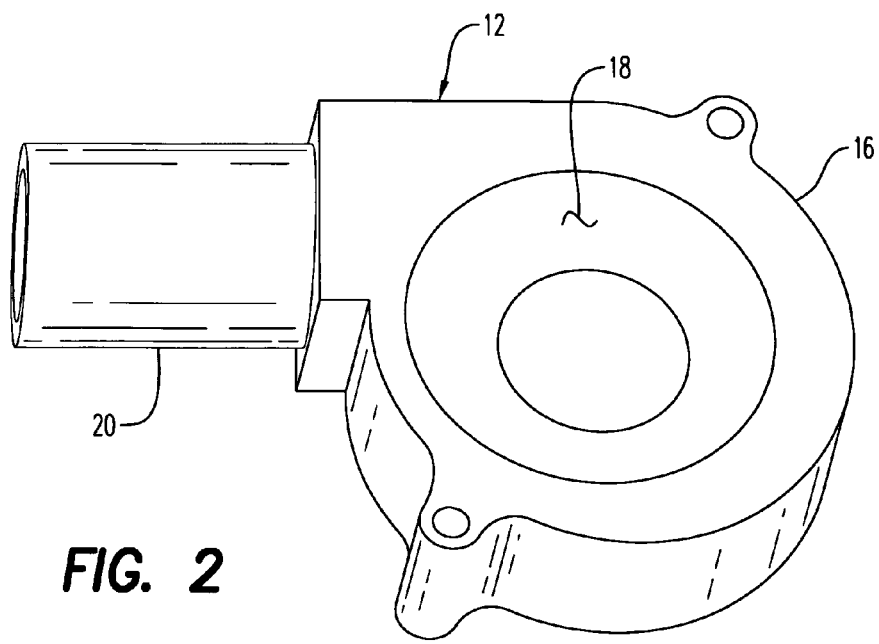
FIG. 2 is a perspective view of the air blower attachable to the motorcycle behind the engine as seen in FIG. 1.
Figure 4:
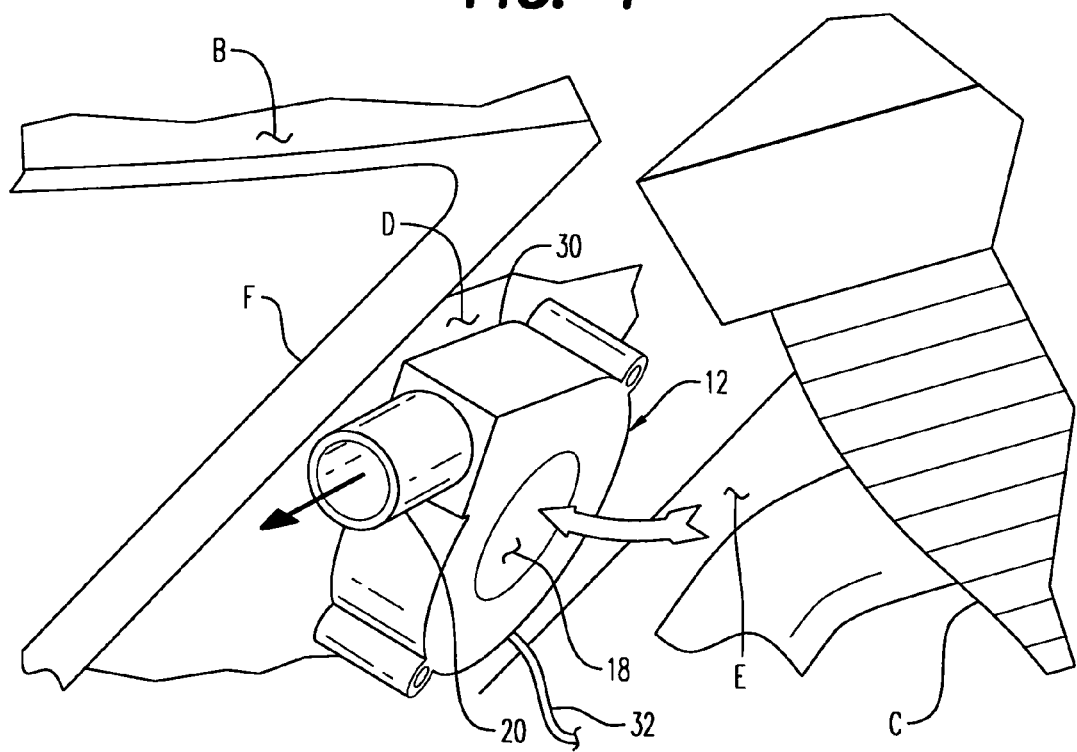
FIG. 4 is an enlargement of the area of FIG. 1 directly behind the motor showing attachment of the air blower.

As seen in FIG. 1, the conventional motorcycle A includes motor C mounted conventionally within the frame F of FIG. 4 and also includes a flat plate D attached to the frame F onto which the air blower 12 is preferably connected either adhesively or mechanically attached preferably in the orientation shown wherein the outlet tube 20 is laterally extending for ease of attachment of one end of the flexible conduit 22 as previously described.

The motorcycle A further includes a padded seat B and a fuel tank G which are in proximity to the environment shown at E in FIGS. 4 and 5 located immediately rearwardly of the motor C and typically between the legs of the user. It is in this area E that air heated by the engine C is collected and easily drawn into the air blower 12.

As best seen In FIG. 5, the rider will typically wear a wind and temperature resistant upper torso garment or jacket J, preferably leather which will prevent cold air from penetrating therethrough and also including a snug waistband H to prevent air from getting beneath the jacket J during riding of the motorcycle A. The air outlet nozzle 26, having the tapered or slanted opening 28, is preferably adapted to be easily slid beneath the lower hem H of the jacket J into the position shown in hidden lines so that air collected into the air inlet portion 18 and delivered for discharge beneath the jacket J through the air outlet nozzle 26 is easily insertable into the position shown in hidden lines in FIG. 5 and is retained there by the relatively tight or snug fitting hem H which further is enhanced in its ability to retain this orientation by the ribs of the flexible conduit 22.

Note that the wiring 32 of the air blower 12 has a connector (not shown) which will easily interconnect with a typically available unused access switch of the motorcycle's electrical wiring system. Note further that, in situations where no flat support panel is available for direct attachment of the air blower thereto, the air blower may include an elongated flexible air intake conduit, the distal end of which is positioned just behind the engine. The air blower may then be mounted nearby, but not directly in the warm air region behind the engine.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A motorcycle heat transfer system, the motorcycle having a heat-producing engine, consisting of:
   an air blower having an air inlet and an air outlet and being connectable to a frame of the motorcycle in an area directly behind the engine to draw heated air directly into said inlet from behind the engine in an area of heated air build-up beneath a rider seat where heat as a byproduct of engine operation accumulates, said air blower connectable to an electric power source of the motorcycle to operate said air blower;
   an elongated flexible air transfer conduit connectable at one end thereof to said air outlet of said air blower;
   an air outlet nozzle connected to another end of said conduit, said outlet nozzle adapted in size and shape to be inserted and held beneath an upper torso garment worn by the rider whereby warmed air is drawn into said conduct from the area of heated air build-up by said air blower for discharge from said nozzle beneath the upper torso garment to warm the rider.

2. A method of warming a rider of a motorcycle comprising the steps of:
   (i) providing a portable heat transfer system comprising:
      an air blower having an air inlet and an air outlet and being adapted to be positioned and secured to a frame of the motorcycle so as to draw heated air from an area directly behind the engine in an area of heated air build-up beneath a rider seat where heat as a byproduct of engine operation accumulates, said air blower connectable to an electric power source of the motorcycle to operate said air blower;
      an elongated flexible air transfer conduit connectable at one end thereof to the air outlet of said air blower;
      an air outlet nozzle connected to another end of said conduit, said outlet nozzle adapted in size and shape to be inserted and held beneath an upper torso garment worn by the rider whereby warmed air is drawn into said conduct from the area of heated air build-up by said air blower for discharge from said nozzle beneath the upper torso garment to warm the rider;
   (ii) attaching said air blower to the frame of the motorcycle directly behind the engine in the area of heated air buildup, the air inlet facing the engine for efficiency in drawing heated air directly into the air blower;
   (iii) attaching the one end of said conduct to the air outlet of said air blower;
   (iv) positioning said nozzle connected to the other end of said conduit beneath the upper torso garment worn by the rider;
   (v) operating the motorcycle to produce heat from the engine.

3. A portable heat transfer system for warming a motorcycle rider, consisting of:
   an air blower having an air inlet and an elongated tubular air outlet and being positionable and securable to a frame portion of a motorcycle behind an engine of the motorcycle directly beneath a rider's seat where heat as a byproduct of engine operation accumulates with said air inlet facing the engine for direct intake of heated air, said air blower connectable to an electric power source of the motorcycle to operate said air blower;
   an elongated flexible air transfer conduit connectable at one end thereof to said air outlet;
   an air outlet nozzle connected to another end of said conduit, said outlet nozzle adapted in size and shape to be inserted and held beneath an upper torso garment worn by the rider to deliver warmed air drawn into said conduct by said air blower for discharge from said nozzle beneath the upper torso garment to warm the rider.

* * * * *